United States Patent [19]
Light

[11] 4,060,905
[45] Dec. 6, 1977

[54] GAUGE FOR MOUNTING WINDOW-SHADE BRACKETS

[76] Inventor: Stanley Light, 325 Grosvenor St., Douglaston, N.Y. 11363

[21] Appl. No.: 715,673
[22] Filed: Aug. 19, 1976
[51] Int. Cl.² ............................................. G01B 3/04
[52] U.S. Cl. .................................... 33/180 R; 33/194
[58] Field of Search ................. 33/180 R, 112, 169 R, 33/174 G, 190, 189, 178 D, 194, 197, 168 R, 169 R

[56] References Cited
U.S. PATENT DOCUMENTS 1,315,716   9/1919   Forester ............................. 33/168 R
2,572,999  10/1951   Elliott ................................ 33/178 D Primary Examiner—Richard E. Aegerter
Assistant Examiner—Willis Little
Attorney, Agent, or Firm—Samuel Lebowitz

[57] ABSTRACT

A gauge for accurately and quickly positioning window-shade brackets by retaining a bracket on the gauge, by magnetic attraction, at a predetermined distance from the top of the window frame to afford adequate room for the shade in its fully rolled position, while this position is marked by an instrument extending through an aperture in the bracket and a slot in the gauge along which the bracket is movable in the course of its positioning. Lineal scales on the gauge facilitate the measuring of the diameter of the window-shade in fully rolled position and the setting of the brackets on the gauge correspondingly. Apertures on the gauge are provided to render it a convenient tool for winding the springs of the window-shade rollers.

13 Claims, 4 Drawing Figures

U.S. Patent  Dec. 6, 1977  4,060,905
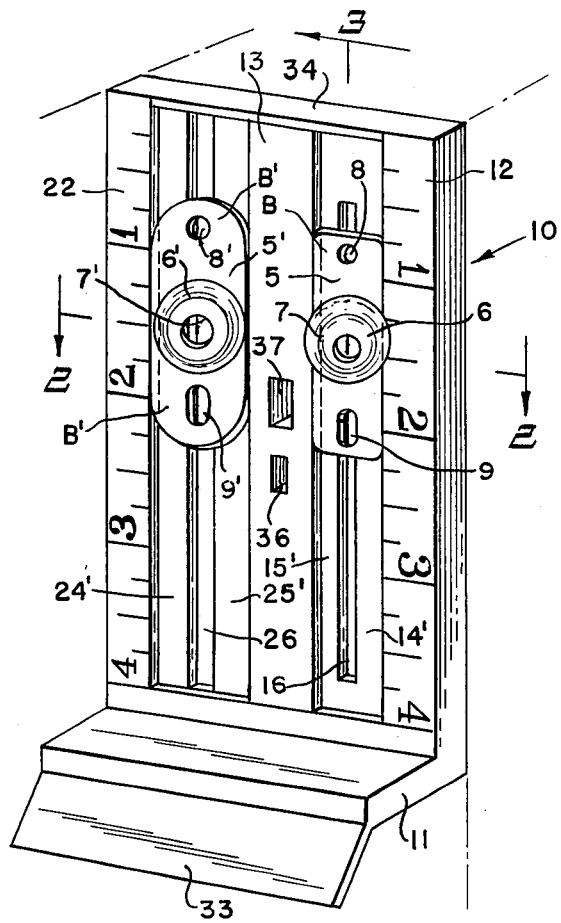
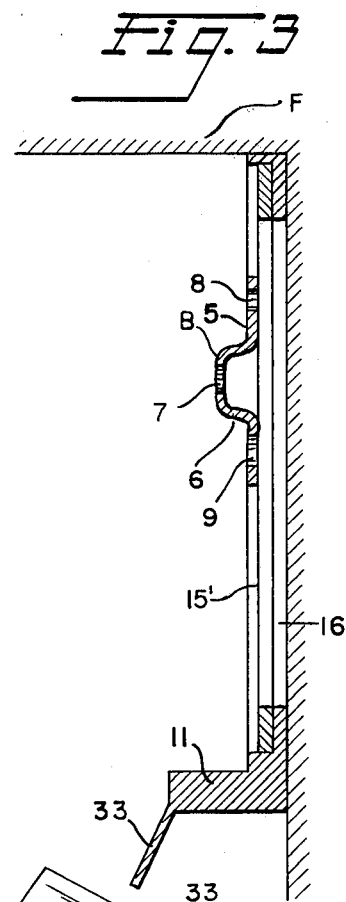
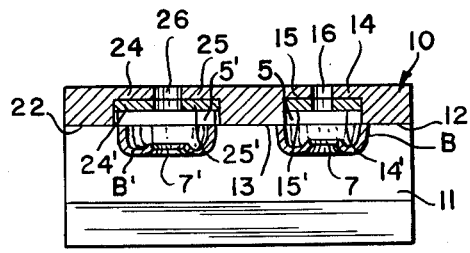
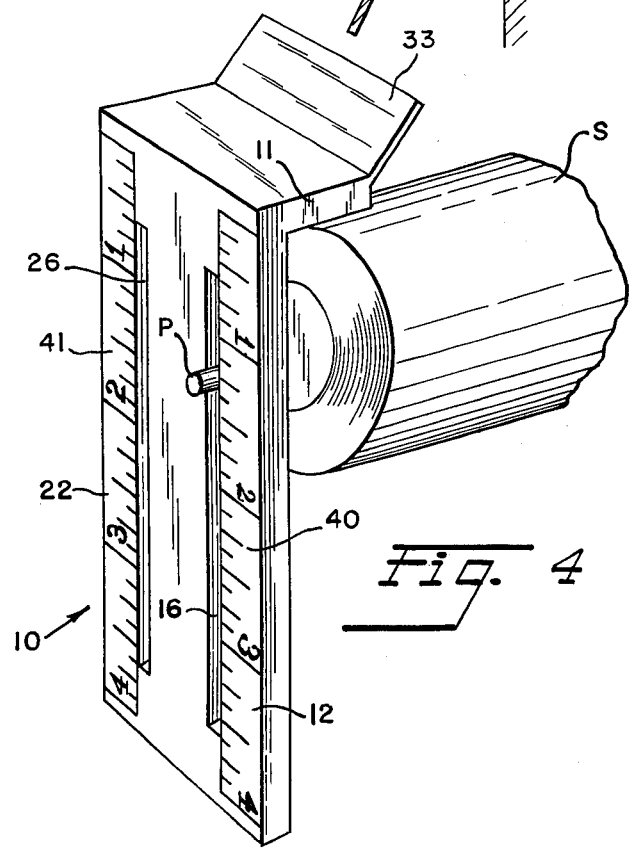
Fig. 1
Fig. 2
Fig. 3
Fig. 4

GAUGE FOR MOUNTING WINDOW-SHADE BRACKETS

This invention relates to a window-shade bracket gauge and more particularly to an instrument which facilitates the fixing of the brackets for supporting window-shade rollers within the window frame, quickly and accurately.

It is the object of the present invention to provide the person installing rolled window-shades within window frames, with an instrument which enables him to position the supporting window brackets within the frame, quickly and accurately, so that the brackets on each side of the window frame may be fixed to the latter in readiness to receive the pin end, as well as the spring tensioning end, to accommodate the window-shade within the frame in horizontal position relative thereto.

SUMMARY OF THE INVENTION

The gauge in accordance with the invention is of rugged and compact construction and provides not only one or more lineal scales for measuring the diameter of the window-shade in its fully rolled-up position, but which also makes possible the ready setting of the bracket and the marking of its mounting position. This is done by supporting the bracket on the gauge, by magnetic attraction, while providing the facility of marking the proper position on the window frame with an awl, pen or pencil, so that the bracket may be affixed to the frame with suitable fasteners following the removal of the gauge.

The positioning of the bracket in its proper place is facilitated by a longitudinal slot at the center of a magnetized guide track for the gauge, which track is preferably recessed to enforce the lineal travel of the bracket along the track. The compact construction of the gauge makes it possible to provide more than one track on the measuring tool, so that brackets of different widths may be positioned for mounting on the same gauge.

THE INVENTION

A preferred embodiment of the invention is illustrated in the accompanying drawings, wherein FIG. 1 is a perspective view of the gauge in accordance with the invention;

FIG. 2 is a horizontal sectional view along line 2—2 of FIG. 1;

FIG. 3 is a vertical sectional view along line 3—3 of FIG. 1; and

FIG. 4 is a perspective view of the gauge in position to measure the diameter of the fully rolled-up shade and to determine the setting point for the supporting bracket within the frame.

As shown in the drawings, the gauge is formed of a vertical guide member 10 of a length sufficient to accommodate the largest diameters of window-shades or about 4 inches, wherefrom a projection 11 extends from one end thereof, serving as a handle. The vertical guide member may be formed of cardboard, plywood, plastic, or the like, having a thickness of approximately ¼ inch, or of sufficient thickness to impart adequate strength to the unit. The tool may be stamped from sheet metal of a gauge sufficient to attain ruggedness, rigidity and a greater degree of compactness. The handle 11, which is an integral part of the guide member 10, is provided with an angular extension at its free end, in the form of a wing 33, which may serve as a supplemental handhold for the handle 11. The surface of wing 33 may be imprinted with indicia, which may be of an advertising nature, if the gauge is marketed as a "give-away" marketing item by window-shade dealers, hardware stores, etc.

The gauge is designed for the handling of window brackets of two sizes, B and B', namely, ½ inch and ⅝ inch in width. For this purpose, the front of the gauge is provided with vertical supports 12 and 22 on the outer sides of the fronts of the gauge with a vertical medial support 13 between the supports 12 and 22. The vertical supports are framed by a horizontal member 34 on the upper end opposite the handle 11.

A track for the bracket B is formed between supports 12 and 13 by recessing these supports at 14 and 15, respectively, to provide a slot 16 between the latter. The undercut portions 14 and 15 are covered by tapes of paramagnetic material, 14' and 15', respectively, which attract thereto the bracket B which is generally stamped from steel or other magnetically attracted metal. The guide tracks 14' and 15' on each side of the slot 16 may be stamped from a rectangular sheet of the paramagnetic material by excising a strip of the latter which overlies the slot 16.

A track of larger width is formed on the other side of the gauge between the vertical support 22 and the intermediate support 13. This track is recessed at 24 and 25 on the opposite sides of the slot 26. An alternative design may be used on this side; the undercut portions 24 and 25 are covered with continuous tapes 24' and 25' of paramagnetic material, to form the tracks for attracting the bracket B' thereto.

The bracket B is provided with the mounting plate 5 having the convex angular protuberance 6 at the midportion thereof fitted with the central circular opening 7 for accommodating the pin of the roller shade to be supported thereby. The mounting plate 5 is fitted with a circular opening 8 at one end thereof and an elongated opening 9 at the opposite end thereof for accommodating the fasteners for affixing the bracket to the window frame. Similarly, bracket B', of greater width, is provided with a mounting plate 5' having an annular protuberance 6' at the midportion thereof fitted with central opening 7' to accommodate the central pin of the shade roller supporting a window shade of larger size than that intended for support by the bracket B. A circular opening 8' and an elongated opening 9' are provided in the mounting plate 5' for accommodating the fasteners for affixing the bracket to the window frame.

In order to extend the range of utility of the bracket gauge, rectangular openings 36 and 37 are provided in the intermediate support 13. The former is of a size sufficient to embrace the winding pintle of a window shade roller, which is supported by brackets B of small size, while the opening 37 is sufficiently large to accommodate the winding pintle of larger rollers for mounting in the brackets B' of larger size. These openings are used for selectively engaging the last-mentioned pintles, thereby to use the gauge as a tool to wind up the springs of the rollers when such is desirable.

The advantageous feature described in the preceding paragraph is sacrificed in the design of a more compact tool of smaller width, namely, one capable of accommodating brackets of only a single size. In such a case, a lineal scale is affixed to the support 13, similar to that on the other lateral support 12, with no additional track therebeyond.

In addition to the lineal scales on the lateral edges of the outer supports 12 and 22, scales 40 and 41 are provided on the outer face of the supports as shown in FIG. 4, but these run in a direction opposite to the scales on the outer faces 12 and 22. As clearly shown in this Figure, the zero point of the reference scale is adjacent to the projection 11.

The gauge described above makes possible the expeditious measuring of the setting points of the brackets for mounting a shade S within the window frame F. The first step in this procedure is the measurement of the diameter of the window shade, in fully rolled condition, in the manner indicated in FIG. 4, by inserting the cylindrical pintle P through the central opening of the bracket which is magnetically attracted to the supports on the guide tracks 14,15, and through slot 16. The pintle is then slid along slot 16 until the rolled-up window shade is brought into contact with the projection 11. The position of the pintle P on scale 40 is noted, for example, 1¼ inch, so that when the shade is removed and the gauge is brought into contact with the upper end of the window frame, as shown in FIG. 3, the bracket is positioned on the magnetized track 14',15', with the central opening 7 at that portion of the scale 12 which is ¼ inch in excess of the scale reading noted in the first measuring step. Thus, as indicated in FIG. 1, the bracket B is shifted and magnetically retained in position to align opening 7 with the 1½ mark on scale 12. At this point, a pencil, nail or awl passing through the lower opening 9 or upper opening 8, indicates the position for affixing the bracket to the window frame when the former is removed from the scale and is applied to the window frame for receiving any suitable fastener such as a brad, nail or screw.

The same distance is marked on the opposite side of the frame with the companion bracket for supporting the rectangular winding pintle of the window shade, so that the gauge permits a ready marking of the fastening points while the brackets are positioned by magnetic attraction on the gauge, and the penetration of the marking tool through an aperture in the bracket and the slot 16 therebelow.

Of course, as indicated in FIG. 4, the pintle P is in engagement with the slot 16, but if the roller were larger, utilizing the larger size brackets, the pintle would be extended through the slot 26 for measuring the distance required for mounting the bracket below the upper wall of the window opening with sufficient clearance for the window shade in its fully wound-up condition.

As described above, the gauge may be fabricated from any suitable material. If sheet metal is used, it may be of magnetic or non-magnetic material. If the former, such as sheet steel, it may be magnetized in whole or in part. The tracks may be stamped as depressions in the outer face of the vertical guide member, and if non-magnetic metal is used, adhesive tapes of magnetic material may be applied to these depressions, as in the case of the embodiment described above.

One or more openings for the winding pins of window shades may be stamped from any portion of the gauge, for example, even the handle portion.

Other changes may be made in the gauge within the purview of the following claims.

I claim:

1. A gauge for determining the proper mounting locations for apertured magnetically attracted mounting brackets for roller window-shades within window frames, comprising,
   a. a substantially flat elongated guide member adapted to be positioned vertically on a window frame,
   b. a track of uniform width on the outer face of said guide member comprised of a pair of elongate supports of paramagnetic material with a longitudinal slot therebetween coincident with the locus of the free movement of a central aperture in the bracket in the course of its freely adjustable movement along the track to a position providing adequate clearance for the fully rolled-up window-shade,
   c. a lineal scale adjacent to one of said supports for noting the position of said central aperture relative thereto while said bracket is retained in a vertical plane solely by the force of magnetic attraction between said track and bracket, and
   d. a projection extending laterally from the outer face of said guide member serving both as a handle for the latter as well as a stop for gauging the diametral dimension of the rolled up shade to provide a setting point for a marking impression on said window frame through an aperture of the bracket and the longitudinal slot of said track.

2. A device as set forth in claim 1, wherein said elongate supports are recessed relative to the outer surface of said guide member to confine the movement of the mounting bracket along said track in a straight line.

3. A device as set forth in claim 2, wherein the outer surfaces of said elongate supports along the opposite sides of said longitudinal slot are covered by tapes of paramagnetic material.

4. A device as set forth in claim 2, wherein the lineal scale on said guide member is on at least one side of the slot between said elongate supports, and a second lineal scale on the opposite face of said guide member and adjacent to said slot with the scale units running in a direction opposite to those on said first-mentioned lineal scale with the starting point remote from the starting point of said first-mentioned lineal scale.

5. A device as set forth in claim 1, wherein said substantially flat elongated guide member is provided with two tracks on the outer face thereof spaced parallelly from each other, each track being of a different width to accommodate mounting brackets of corresponding different widths.

6. A device as set forth in claim 5, including a lineal scale adjacent to each track along the outer edges of said guide member.

7. A device as set forth in claim 6, wherein the midportion of said guide member between said tracks is provided with a pair of rectangular openings of different size to fit the winding pintles of the spring-operated rollers adapted to be mounted on the mounting brackets of different widths.

8. A device as set forth in claim 6, wherein the inner face of said guide member is provided with lineal scales adjacent the opposite longitudinal edges thereof, with said scales running in a direction opposite to the lineal scales on the outer side, with the starting points opposite to said projection.

9. A device as set forth in claim 5, wherein the elongate supports of each track are recessed relative to the outer surfaces of said guide member to confine the movements of the mounting brackets along said tracks in straight lines.

10. A device as set forth in claim 9, wherein the outer surfaces of said elongate supports along the opposite sides of the longitudinal slots are covered by continuous lengths of tapes of paramagnetic material.

11. A gauge for determining the proper mounting locations for apertured magnetically attracted mounting brackets for roller window-shades within window frames, comprising
   a. a substantially flat elongated guide member of sheet material having a handle extending transversely from one end thereof and adapted to be positioned vertically on a window frame,
   b. a constant-width of track of magnetized material beyond said handle on the outer face of said guide member with a medial longitudinal slot in the track for retaining a mounting bracket thereon solely by magnetic attraction while permitting free movement of the latter therealong during coincidence of the central aperture in the bracket with said slot,
   c. a lineal scale on the inner face of said guide member adjacent to said slot, starting from the handle end to the opposite free end, said scale adapted to have the pin of the window-shade roller indicate the radius of the fully rolled shade when the shade is in abutment with the handle, and the pin extends through the central aperture in the bracket and said slot, and
   d. a second lineal scale on the outer face of said guide member starting from said opposite free end of the latter for gauging an incremental setting for the bracket in excess of the radial dimension of the shade, which setting is adapted to be marked by a marking instrument extending through an opening in the bracket and slot therebelow to the body of the window frame.

12. A device as set forth in claim 11, wherein said sheet material is magnetized sheet steel.

13. A device as set forth in claim 11, having a rectangular opening in a part thereof for accommodating the winding pintle of the spring-operated roller of the window shade.

* * * * *